US012718675B2

(12) United States Patent
Bertz et al.

(10) Patent No.: US 12,718,675 B2
(45) Date of Patent: Aug. 25, 2026

(54) METHODS AND SYSTEMS OF DUAL-DOMAIN BASED TAG LOCATION DETECTION IN AN INVENTORY ENVIRONMENT

(71) Applicant: T-Mobile Innovations LLC, Overland Park, KS (US)

(72) Inventors: Lyle Bertz, Lee's Summit, MO (US); Robert Butler, Overland Park, KS (US); Zheng Fang, Mclean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 16 days.

(21) Appl. No.: 18/967,604

(22) Filed: Dec. 3, 2024

(65) Prior Publication Data

US 2026/0155029 A1 Jun. 4, 2026

(51) Int. Cl.
*G08B 13/24* (2006.01)

(52) U.S. Cl.
CPC ................................ *G08B 13/2462* (2013.01)

(58) Field of Classification Search
CPC ................................................. G08B 13/2462
USPC ...................................................... 340/572.1
See application file for complete search history.

(56) References Cited

U.S. PATENT DOCUMENTS

| | | | | |
|---|---|---|---|---|
| 11,057,751 | B1 | 7/2021 | Niranjayan et al. | |
| 11,113,485 | B2 | 9/2021 | Madhusudhana et al. | |
| 2021/0334824 | A1 * | 10/2021 | Astvatsaturov ...... | G06Q 10/087 |
| 2022/0084236 | A1 | 3/2022 | Send et al. | |

FOREIGN PATENT DOCUMENTS

| | | | | |
|---|---|---|---|---|
| CN | 111091320 | A | 5/2020 | |
| EP | 4756687 | A1 | 6/2026 | |
| WO | WO-2019045641 | A1 * | 3/2019 | ........... G06Q 10/087 |
| WO | 20230240296 | A1 | 12/2023 | |

OTHER PUBLICATIONS

Osrfid. "Locate RFD Tags With Sound & Signals", Apr. 18, 2024 (Apr. 18, 2024), XP093323912, retrieved from the internet: URL:https://www.youtube.com/watch?v=tMRr5N-imKw [retrieved on Oct. 9, 2025].

Shenzehen Jietong Technology Co.: "2.4 GHz Active RFID Acousto-optic Tag with Light and Sound JT-T2483", AliBaba, Oct. 7, 2023 (Oct. 7, 2023), pp. 1-13, XP093323932, retrieved from the internet: URL:https//chinese.alibaba.com/product-detail/2-4GHz-Active-RFID-Acousto-optic-1600 941490124.html [retrieved on Oct. 9, 2025].

(Continued)

*Primary Examiner* — Kam Wan Ma

(57) ABSTRACT

A method comprises determining, by an application, a current variance between a reference tag location of a reference tag and an active tag location of an active tag based on a response signal received from the active tag and an image depicting a light-emitting diode (LED) on the reference tag, comparing, by the application, the current variance of the reference tag location and the active tag location with an expected variance of the reference tag location and a prior active tag location, and performing, by the application, a corrective action when the current variance deviates from the expected variance beyond a threshold based on a rule.

20 Claims, 7 Drawing Sheets

(56) References Cited

OTHER PUBLICATIONS

Tian, et al., "Localization of Tagged Objects on Shelf via a Portable Camera-augmented RFID Reader", 2021 International Conference on Computer Communications and Networks (ICCCN), IEEE, Jul. 19, 2021 (Jul. 19, 2021), pp. 1-9, XP033966733, DOI: 10.1109/ICCCN52240.2021.9522312 [retrieved on Aug. 25, 2021].

Foreign Communication From a Related Counterpart Application, International Search Report and Written Opinion dated Oct. 20, 2025, International Application No. PCT/US2025/041398 filed on Aug. 8, 2025.

Foreign Communication From a Related Counterpart Application, International Search Report and Written Opinion dated Nov. 14, 2025, International Application No. PCT/US2025/041399 filed on Aug. 8, 2025.

Restriction Requirement dated Jan. 9, 2026 U.S. Appl. No. 18/799,882, filed Aug. 9, 2024.

Bertz, Lyle, et al., "Methods and Systems of Tag Location Detection in an Inventory Environment based on Audio Attributes of Audio Signals Received from Tags using Audio Machine Learning", filed Aug. 9, 2024, U.S. Appl. No. 18/799,882.

Bertz, Lyle, et al., "Methods and Systems of Tag Location Detection in an Inventory Environment Based on Visual Attributes of Tags Using Computer Vision", filed Aug. 9, 2024, U.S. Appl. No. 18/799,878.

Office Action dated May 11, 2026 U.S. Appl. No. 18/799,882, filed Aug. 9, 2024.

Foreign Communication From a Related Counterpart Application, European Extended Search Report and Written Opinion dated Apr. 13, 2026, European Application No. 25219952.6 filed on Dec. 2, 2025.

* cited by examiner

METHODS AND SYSTEMS OF DUAL-DOMAIN BASED TAG LOCATION DETECTION IN AN INVENTORY ENVIRONMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern inventory environments (e.g., warehouses and retail stores) may store items on behalf of various customers/business enterprises. Each item may be coupled to one or more tags, such as a Radio Frequency Identification (RFID) tag. Antenna systems and/or reader devices may be positioned throughout the inventory environment. RFID tags may include various components, such as, for example, an integrated circuit for storing and processing information, an antenna for communicating signals, etc. For example, the integrated circuit may include memory for storing tag data (e.g., a unique identifier), a modulator for modulating signals, and circuitry for power management. The RFID tag may receive signals from antenna systems/reader devices to obtain power, obtain power from the received signals, and transmit responses back to the reader devices.

SUMMARY

In an embodiment, a method of dual-domain based tag location detection in an inventory environment is disclosed. The method comprises determining, by an application executing at a computer system in an inventory management system, a reference tag location of a reference tag in an inventory environment based on a first image depicting a light-emitting diode (LED) on the reference tag, first image metadata associated with the first image, and camera parameters associated with a camera that captured the first image, determining, by the application, an active tag location of an active tag in the inventory environment based on a first response signal carrying tag data received from the active tag and first signal metadata associated with the first response signal, and computing, by the application, an expected variance between the reference tag location and the active tag location. The method further comprises subsequently receiving, by the application, a second response signal from the active tag comprising the tag data and second signal metadata associated with the second response signal, instructing, by the application, the camera to capture a second image depicting the reference tag when the LED on the reference tag is activated when the second signal metadata associated with the second response signal is different from the first signal metadata associated with the first response signal received from the active tag, and receiving, by the application, a second image and second image metadata associated with the second image from the camera. The method further comprises confirming, by the application, that the reference tag location of the reference tag has remained constant based on the second image, the second image metadata, and the camera parameters, modifying, by the application, the active tag location of the active tag based on the second response signal and the second signal metadata associated with the second response signal in response to confirming the reference tag location of the reference tag, computing, by the application, a current variance between the reference tag location and the active tag location, and performing, by the application, a corrective action when the current variance deviates from the expected variance beyond a threshold, wherein the corrective action comprises at least one of modifying the expected variance based on the active tag location or modifying the active tag location based on the expected variance.

In another embodiment, an inventory system comprises a reader device configured to transmit interrogation signals to a reference tag and an active tag, wherein the reference tag comprises a light-emitting diode (LED), receive, from the active tag, a response signal carrying tag data, transmit the tag data and signal metadata describing the response signal to an inventory management system, and transmit an instruction to a camera to capture an image depicting the LED on the reference tag when the LED is activated. The camera is configured to transmit the image and image metadata describing the image to the inventory management system. The management comprises a memory, and a management application stored on the memory, which when executed by a processor of the inventory management system, causes the management application to determine a current variance between a reference tag location of the reference tag and an active tag location of the active tag based on the response signal, the signal metadata, the image, and the image metadata, wherein the current variance is a first vector indicative of a first difference between the reference tag location and the active tag location, compare the current variance between the reference tag location and the active tag location with an expected variance between the reference tag location and a prior active tag location, wherein the expected variance is a second vector indicative of a second difference between the reference tag location and an expected active tag location of the active tag, and update location data of the active tag to be the active tag location when the current variance deviates from the expected variance by more than a threshold.

In yet another embodiment, a method comprises determining, by an application executing at a computer system in an inventory management system, a current variance between a reference tag location of a reference tag and an active tag location of an active tag based on a response signal received from the active tag and an image depicting a light-emitting diode (LED) on the reference tag, wherein the current variance is a first vector indicative of a first difference between the reference tag location and the active tag location, comparing, by the application, the current variance of the reference tag location and the active tag location with an expected variance of the reference tag location and a prior active tag location, wherein the expected variance is a second vector indicative of a second difference between the reference tag location and an expected active tag location of the active tag, and performing, by the application, a corrective action when the current variance deviates from the expected variance beyond a threshold based on a rule, wherein the corrective action comprises at least one of modifying the expected variance based on the active tag location or modifying the active tag location based on the expected variance.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
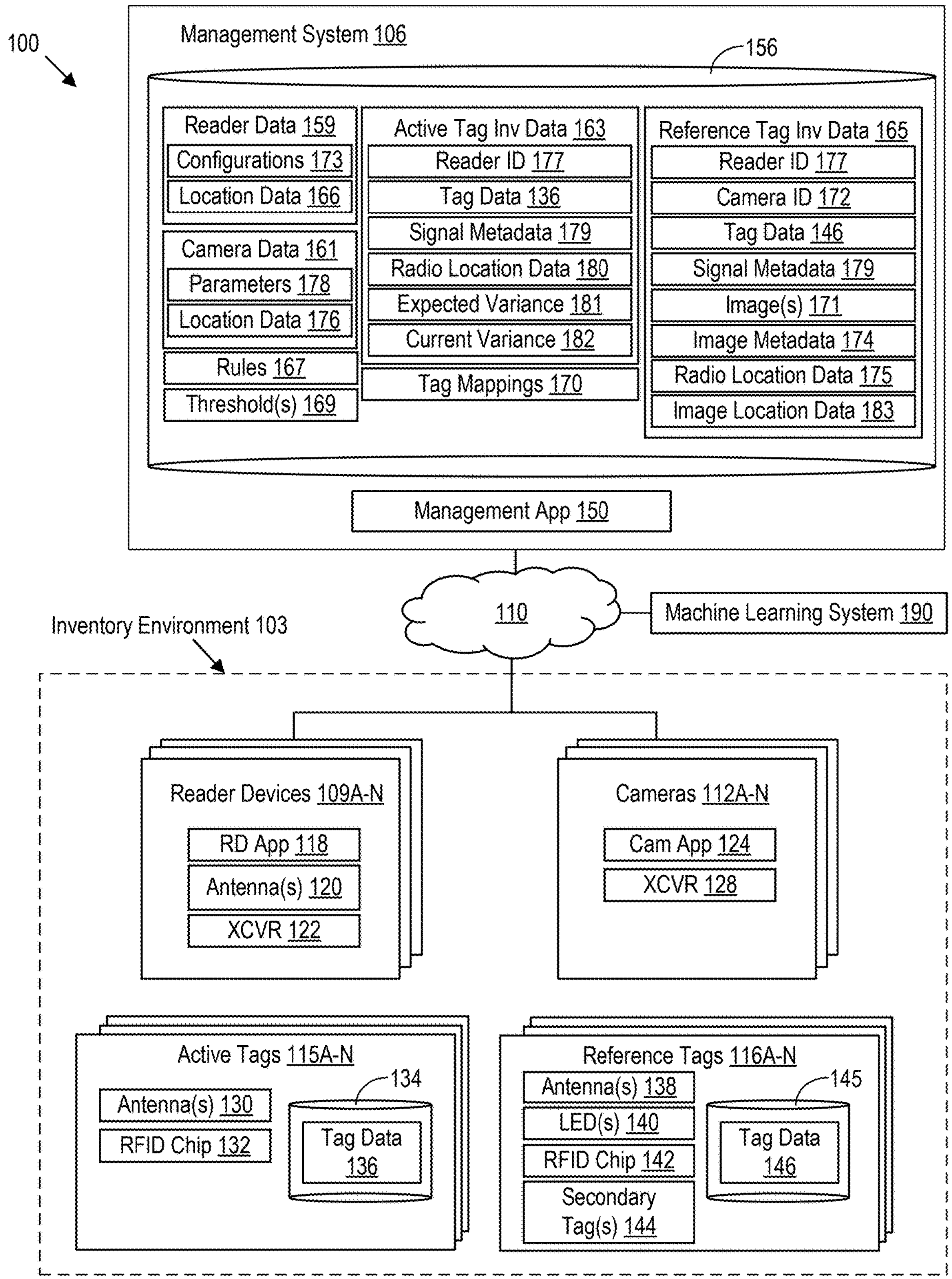
FIG. 1 is a block diagram of a communication network including a dual-domain inventory system for performing tag location detection based on RFID signals and visual signals according to various embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

RFID reader devices (also referred to herein as "reader devices") operate by emitting radio frequency signals through antennas to communicate with RFID tags attached to items in an inventory environment, such as a warehouse or retail store. Specifically, the reader devices may communicate with RFID tags by emitting interrogation signals in a predefined frequency band (e.g., licensed frequency band). These signals may be used to harvest power at the RFID tags, and using the harvested power to transmit tag data, such as a unique identifier back to the reader device. The RFID tag responds by modulating its signal and radiating a response signal that contains the tag data.

The reader device receives the response signal from the tag and captures both the tag data and metadata about the response signal, such as the received signal strength indicator (RSSI), phase of the signal, timing information associated with the signal, etc. The reader device then forwards this data and metadata to a management system for processing. The management system may use the known location of the reader device and the signal metadata to estimate a location of the RFID tag (e.g., using triangulation, trilateration, signal-strength based calculations, time-of-arrival, or time-of-flight calculations, etc.)

However, the aforementioned signal-based location estimation methods in RFID systems are often problematic, particularly when precise location determination is desired. The signal-based estimated location may be unreliable because of various factors, such as signal reflection, interference, multipath propagation, etc., all of which can distort the response signals received from RFID tags and can cause inaccuracies in the signal strength (RSSI), phase, or timing data using to compute the RFID tag's location. Therefore, the response signals received from RFID tags may only provide an approximate location of the tag, with errors up to several feet, making it difficult to pinpoint exactly where an item is located within an inventory environment. In some cases, multiple reader devices may be used to perform triangulation/trilateration on the response signals received from the RFID tags, but even then, the determined locations may still be largely inaccurate. RFID movement complicates the estimation further, as the system may have to continuously track the changing position using updated signals, which introduces lag and increases the chance of error due to varying signal conditions or disruptions. Without advanced filtering or smoothing algorithms, rapidly changing signal metadata can lead to noisy or inconsistent location estimates. This makes it challenging to detect when changes occur in the inventory environment, when RFID tags move within the inventory environment, or when RFID tags leave the environment altogether, leading to inefficiencies in inventory tracking and management. Therefore, inventory systems may be experiencing the aforementioned technical problems in the technical field of inventory management and precision tracking of tags.

The present disclosure addresses the foregoing technical problems by providing a technical solution in the technical field of inventory management and precision tracking of tags, by implementing a dual-domain inventory system. The dual-domain inventory system may perform location estimation of an active RFID tag (hereinafter referred to as "active tag") based on an image-based location estimate of a corresponding reference RFID tag (hereinafter referred to as "reference tag") in an inventory environment. The reference tag may include a light emitting diode (LED) and may be positioned at the same or substantially the same location as one or more active tags, such that the image-based location of the reference tag may be used to cross-check or modify a signal-based location estimate of an active tag. The use of the different domains or spectrums (non-visible radio/RFID signal domain and visible/LED signal domain) for location estimation based on a known location of a reference tag may result in the use of different location estimation algorithms for the same active tag, thereby resulting in a more accurate prediction/confirmation of changing tag locations, a more accurate method of testing and/or recalibrating the inventory system, a more efficient and accurate method of tuning location estimation formulas or machine learning models, and/or inventory system calibration.

In an embodiment, the dual-domain inventory system may include reader devices, antennas (e.g., separate from the reader devices or integrated with the reader devices), cameras (e.g., separate from the reader devices or integrated with the reader devices), active tags positioned on items, reference tags positioned at various fixed positions in the inventory environment, and a management system that controls the operations of the reader devices. The reader devices may be configured to operate on the licensed or unlicensed frequency bands to communicate with the active tags and the reference tags in the inventory environment. The active tag may refer to RFID tags positioned on movable items in the inventory environment, and the location estimation methods disclosed herein may be used to estimate the location of these active tags. The reference tags may be positioned at fixed locations in the inventory environment, and may be used as a baseline for comparison with the active tags, particularly when the active tags change locations. The reference tags may include both one or more RFID chips (e.g., that may communicate over licensed or unlicensed frequency bands), one or more LEDs, and/or any other form of secondary communication technologies (e.g., near field communications (NFC), ultraviolet radiation (UV) technologies, infrared (IR) technologies, etc.) over which signal may be communicated and evaluated for location determination. The active tags and the reference tags may otherwise both include memory storing tag data, a processor, and one or more antennas configured to communicate the tag data.

An inventory environment (e.g., a retail store and warehouse) may include any number of items (up to thousands or millions of different items), and each item may be coupled or attached to at least one active tag. For example, the items with active tags may be positioned on racks, crates, storage bins, or conveyor belts in a warehouse environment, or the items with active tags may be positioned on shelves, racks, or shopping carts within a retail store environment. The items with active tags may be moved within the inventory environment, for example, either by an employee of the warehouse, a customer of the store, or a vehicle (e.g., forklift). For example, an employee may manually move items around within the warehouse or place the item on a conveyor belt for movement, or a customer may pick up an item, place the item in a shopping cart, and continue walking around the store. In this way, active tags may freely move within the inventory environment.

Meanwhile, the reference tags may not necessarily be coupled to an item or any group of items, and thus may not move freely within the inventory environment (i.e., employees may not freely move the reference tags around within the warehouse, and customers may not pick up and move the reference tags). Rather, the reference tags may be positioned in fixed locations within the inventory environment, specifically in association with other items and active tags within an area of the inventory environment. For example, a reference tag may be positioned at the top of a shelf supporting a number of items with active tags, a reference tag may be positioned at the top of a circular clothing rack carrying clothes each having active tags, a reference tag may be positioned on a structural column within the inventory environment, etc. In some cases, the reference tag may be coupled with or on the same substrate/packaging as the active tag—these reference tags may not be fixed in inventory environment, but may move to the same location(s) as the active tag.

The management system may maintain a data store with data describing the reference tags, active tags, reader devices, and cameras. For example, the data store may store reader data describing the configurations (e.g., frequency band, directional setting, etc.) and locations of each reader device used in the inventory environment, and camera data describing the camera parameters (e.g., a focal length between a camera sensor and lens, field of view, etc.) and locations of each of camera deployed in the inventory environment. The data store may also maintain active tag inventory data based on the response signals received from the active tags in the inventory environment. The active tag inventory data may include an identification of the reader device that communicated with the active tag, the tag data received from the active tag, signal metadata describing attributes of the response signal over which the tag data was received, radio location data defining a signal-strength based location of the active tag computed using the response signal, and an expected variance between the radio location data of the active tag and image location data of an associated reference tag (as further described herein).

The data store may also maintain reference tag inventory data based on the response signals received from the reference tags and images depicting the LEDs on the reference tags in the inventory environment. The reference tag inventory data may include an identification of the reader device that communicated with the reference tag, an identification of a camera that captured an image depicting an LED on the reference tag, the image of the reference tag, the tag data received from the reference tag, signal metadata describing attributes of the response signal over which the tag data was received, radio location data defining a signal-strength based location of the active tag computed using a response signal received from the reference tag, and image location data defining a an image-based location of the reference tag computed using the image of the LED on the reference tag.

The data store may also store thresholds, such that the management application may determine whether a change in an inventory environment has occurred, whether a configuration has changed in the inventory environment, or whether an item has moved in the inventory environment, as further described herein. The data store may also store rules (e.g., logic, code, conditions, etc.), and a management application at the management system may be programmed according to the rules to perform the dual-domain based tag location detection methods disclosed herein.

To perform an embodiment of the tag location detection method, the management application may first take a baseline inventory of the inventory environment, to scan the active tags and reference tags and capture images of the reference tags, and then determine expected variances between locations of the active tags and reference tags. The management application may transmit, at a first time, instructions to the reader devices in the inventory environment to scan all the tags (active tags and reference tags) within a read zone of the reader devices, and transmit, at the first time, instructions to the cameras in the inventory environment to capture images of the reference tags in a visual zone of the cameras.

Based on the received instruction, the reader devices may then transmit, at a second time subsequent to the first time, interrogation signals into the respective read zones. The RFID chips of the active tags and references tags within the read zones may then obtain power using the received signals. The active tags may use the power to transmit back response signals carrying locally stored tag data. The reference tags may use the power to not only transmit back response signals carrying locally stored tag data, but also to power the LED of the reference tag to activate (e.g., turn on, flash, etc.) for at least a predefined period of time. The cameras may then, at a third time (e.g., milliseconds after the second time) based on the instruction received from the management application, capture images depicting the activated LEDs on the reference tags within the visual zone of the cameras. The third time may be a predefined period of time after the second time, to ensure that the reference tag is properly powered to activate the LED before the camera captures the image depicting the activated LED. Thereafter, the reader devices receive response signals from active tags and reference tags, while the cameras capture images depicting active LEDs on the reference tags.

The reader devices may then obtain signal metadata for each of the response signals received from the active tags and reference tags. The signal metadata may include, for example, an RSSI of the response signal, a time-of-arrival of the response signal, a time-of-flight of the response signal, an angle of arrival of the response signal, a phase of the response signal, and/or any other metadata describing one or more attributes of the response signal carrying the tag data. The reader devices may then transmit the received tag data and signal metadata describing the received response signals to the management system.

The cameras may also obtain image metadata for each of the captured images. The image metadata may include, for example, a timestamp of capturing the image (e.g., the third time) and a resolution of the image (e.g., number of pixels). In some cases, the camera may determine pixel coordinates (x, y coordinates) of the LED within the image, for example, using computer vision methods. The cameras may then transmit the captured images and image metadata describing attributes of the images to the management system.

The management application at the management system may receive the tag data, signal metadata, images, and image metadata, and then determine the locations of the tags and expected variances of the active tags based on the rules stored at the data store. First, the management application may determine a radio-based location of each of the tags (e.g., both active and reference tags) using the signal metadata of the response signals received from each of the tags using a rule (e.g., in which the rule prescribes the equation, algorithm, or method for calculating the radio-based location). For example, when the signal metadata includes the RSSI of the response signal, the management application may determine a location of a tag using an RSSI-based localization method since the RSSI provides an estimate of the distance between the reader device and the tag and since the location of the reader device is stored at the data store. The RSSI-based localization method may input variables (RSSI, transmit power, path loss exponents, etc.) into an RSSI-based localization equation to determine a distance between the reader device and the tag, which may be used to determine a location (e.g., three dimensional coordinates, geohash, etc.) of the tag. Additionally or alternatively, when the signal metadata includes the angle of arrival of the response signal, the management application may determine a location of a tag using an angle of arrival-based localization method since the angle of arrival measures a direction from which the reader device received the response signal. Additionally or alternatively, when the signal metadata includes the time-of-flight of the response signal, the management application may determine a location of a tag using a time-of-flight-based localization method since the time-of-flight directly corresponds to a distance between the tag and reader device. The signal metadata may be provided as input into one or more equations (in some cases, using one or more machine learning model systems) to output an estimated location of the tag. In this way, the management application may determine radio location data for each of the active tags and reference tags from which response signals were received.

Second, the management application may determine, using a rule, an image-based location of each of the reference tags using the images depicting the LEDs on the reference tags, the image metadata (e.g., resolution), and camera parameters of the respective camera (e.g., focal length, sensor size, optical center, field of view, skew coefficient, pixel ratio, camera position, camera orientation, etc.). For example, the rule may prescribe the equation, algorithm, or method for calculating the image-based locations. The management application may first identify and determine the pixel coordinates (x, y) of the activated LEDs in all of the images using, for example, computer vision methods or machine learning models accessible by the management system. For example, when the camera parameters are known and the pixel coordinates of the activated LEDs have been determined, the management application may determine a location of the activated LEDs using a pixel-based estimation method, in which a position of the LED in the 2D image may be mapped back to the three-dimensional (3D) world using geometric relationships (e.g., using a machine learning model or a computer vision application). For example, the pixel-based estimation method may input variables (camera parameters, pixel coordinates, etc.) into a pixel-based estimation equation to determine a depth, or distance between the camera and the LED, which may be used to determine a location (e.g., three dimensional coordinates, geohash, etc.) of the reference tag.

At this stage, the management application may have determined a radio-based location of all of the active tags and an image-based location of all of the reference tags. In an embodiment, the management application may store predefined mappings between reference tags and active tags indicating the active tags that are proximate to (or within a predefined distance from) one or more reference tags, such that the location of a reference tag may be used as a relative location of the active tags. In another embodiment, the management application may use a machine learning model to intelligently determine the mappings between the reference tags and active tags.

The management application may then determine an expected variance between a radio-based location of each active tag and an image-based location of a corresponding reference tag (based on the aforementioned mappings between active tags and reference tags). For example, the expected variance may be a vector identifying a difference in both direction and distance between the radio-based location of an active tag and an image-based location of the corresponding reference tag. The management application may store the expected variance in association with the active tag.

Subsequently, the reader devices may be programmed to, consistently or intermittently according to a predefined schedule, scan all the tags within the read zone, receive tag data in response signals from the tags, and transmit the tag data and signal metadata of the response signals to the management system. The management application may be triggered to evaluate the received signal metadata according to one or more rules, to determine whether signal metadata of response signals received from an active tag is different from the signal metadata of previously received response signals from the active tag. Additionally or alternatively, the management application may be triggered to determine whether a current radio-based location of an active tag (determined based on the signal metadata) deviates (i.e., is different) from a prior radio-based location of the active tag, as stored in the data store. When the management application determines that signal metadata of response signals received from an active tag is different from the signal metadata of previously received response signals from the active tags and/or that the current radio-based location of the active tag deviates from a prior radio-based location of the active tag, the management application may be triggered to perform various tasks based on one or more rules.

In an embodiment, the management application may determine whether the radio-based location change of the active tag is based on a configuration change or an environmental change in the inventory system. For example, an RSSI-based location may be influenced by several factors, such as multipath propagation (reflection/diffraction), interference from other radio frequency sources, antenna position and orientation, environmental changes, reader/system calibration, reader sensitivity, power supply variability, etc. In an embodiment, the rule may instruct the management application to initiate performance of one or more tests to determine whether the radio-based location change of the active tag may have been caused by one or more of the aforementioned configuration/environmental related factors.

In an embodiment, the management application may first instruct the camera to capture another image of the reference tag to determine whether the reference tag has also changed locations or whether the location of the reference tag has remained constant. If the location of the reference tag has remained constant, the management application may instruct the reader device to receive an updated response signal from the RFID chip on the reference tag and obtain updated signal metadata describing attributes of the updated response signal. If the signal metadata of the updated response has changed similar to the signal metadata of a current response signal received from the active tag, then the management application may determine that the location change of the active tag is based on an RFID or radio signal distortion occurring in the area. Similarly, if a variance (e.g., vector difference) between a current radio-based location of the reference tag (determined based on the signal metadata received from the reference tag) and a prior radio-based location of the reference tag (as saved in the data store) is the same, then the management application may determine that the location change of the active tag is based on an RFID or radio signal distortion occurring in the area. Therefore, the management application may determine that the location of the active tag has not actually changed. Instead, only the radio signals received from the active tag and the reference tag have changed.

On the other hand, when the response signals received from the reference tag/current radio-based location of the reference tag is the same as before (i.e., did not change), then the management application may perform other tests/actions to determine whether a configuration error is occurring or whether the active tag has actually moved. As another example, the management application may instruct the repositioning of a reader device (e.g., robotically control a robotic arm supporting a reader device) to alter the angle of reflection and test whether the alteration significantly affects the RSSI, in which case, multipath propagation could be the cause of the radio-based location change. As another example, the management application may temporarily disable or relocate other radio frequency emitting devices to determine whether the RSSI readings stabilize. As yet another example, the management application may use multiple antennas to read the active tag, and compare the readings to identify inconsistencies caused by antenna placement. In an embodiment, the data gathered from these tests (that identify configuration/environmental changes affected the response signals received from tags) may be used to modify equations, variables, or algorithms (e.g., machine learning algorithms) used to determine radio-based locations of the tags.

The management application may additionally or alternatively determine whether the radio-based location change is caused by an actual movement of the active tag and item (i.e., a change in the inventory environment). In an embodiment, the management application obtains the current radio-based location of the active tag and then extracts an expected variance of the active tag stored in the active tag inventory data of the active tag. The management application may then compute a current variance between the current radio-based location of the active tag and the image-based location of a corresponding reference tag. The current variance may be a vector identifying a difference in both direction and location/distance between the current radio-based location of the active tag and the image-based location of the associated reference tag.

The management application may then access a rule, which may indicate a predefined threshold for the reader device and/or active tag (e.g., based on a frequency band, read range, power, or other attribute of the reader device and/or active tag). The rule may instruct the management application to perform a comparison of the current variance with the expected variance to determine whether the current variance deviates from the expected variance beyond the threshold defined in the rule. For example, when the threshold indicates a predefined value and/or angular difference, and a difference between the current variance deviates and the expected variance is greater than the predefined value and/or angular difference, the management application may determine that the current variance deviates from the expected variance beyond the threshold.

When the current variance deviates from the expected variance beyond the threshold, the management application may determine or confirm that the active tag (and item) has indeed changed locations. In some cases, the management application may be programmed to perform a corrective action based on a rule. For example, a rule may indicate a type of corrective action to perform based on an attribute of the reader device and/or active tag (e.g., based on a frequency band, read range, power, or other attribute of the reader device and/or active tag). The corrective action may be, for example, modifying the expected variance of the active tag based on the changed location, modifying the radio-based location of the active tag by the expected variance to obtain an updated location of the active tag, modifying or tuning an artificial intelligence model/classification model/location estimation equation, recalibrating at least one of the reader device or camera based on the active tag location or the reference tag location, adjusting a setting of an antenna of the reader device, continuously monitoring and updating the active tag location, etc.

In some embodiments in which the reference tag and active tag are coupled to the same item/package, the location of the reference tag may not necessarily be used as a reference point. Instead, the radio-based location of the reference tag may be compared with the image-based location of the active tag to further corroborate/refine the location of the active tag. Said another way, the radio-based location of the reference tag provides another layer of location data to use with the image-based location of the item, leading to a more accurate calculation of the location of the item upon which both the reference tag and active tag are located.

Therefore, the embodiments disclosed herein efficiently confirm whether an inventory item has moved within the environment or whether a configuration or environmental change has occurred in the area that would affect the radio signals communicated by the tags. The use of the dual-domain inventory system that performs signal-based location estimation and image-based location estimation improves the accuracy and precision of tag location computations an inventory environment, such that when a configuration/environmental change affects the radio signals in the RFID domain, the visual signals in the visual domain (e.g., based on the image capturing the LED) remain unaffected by the configuration/environmental change. More precise and accurate locations of RFID tags are crucial for inventory management, allowing for real-time tracking of items and reducing the likelihood of misplaced or lost items, while optimizing environment operations to enable faster item retrieval and identification of stolen items, automated inventory counts, and efficient inventory management. Accordingly, the embodiments disclosed herein enable a more efficient use of the resources in the inventory system to more accurately identify missing and moving items in the inventory environment, thereby increasing inventory system efficiency and capacity.

Turning now to FIG. 1, a communication network 100 is described. The communication network 100 includes an inventory environment 103, a management system 106, a network 110, and a machine learning system 190. The inventory environment 103 includes one or more reader devices 109A-N, cameras 112A-N, active tags 115A-N, and reference tags 116A-N. The network 110 may be one or more private networks, one or more public networks, or a combination thereof. While the management system 106 and the machine learning system 190 are shown in FIG. 1 as being separate from network 110, in some embodiments, it should be appreciated that the management system 106 and the machine learning system 190 may be part of the network 110. In the embodiment shown in FIG. 1, an inventory system may include the management system 106, the reader devices 109A-N, cameras 112A-N, active tags 115A-N, and reference tags 116A-N.

The active tags 115A-N and reference tags 116A-N may each include RFID tags, or small devices used in inventory systems to store and transmit data wirelessly to reader devices 109A-N. Each of the active tags 115A-N and reference tags 116A-N includes a microchip (e.g., an integrated circuit with processing and memory resources) for data storage and processing, one or more memories, and one or more antennas for communication. For example, the active tags 115A-N may include an RFID chip 132 (e.g., the aforementioned microchip), an antenna 130 for transmitting and receiving signals over different frequency bands, and a data store 134 (e.g., one or more memories) for storing tag data 136. The tag data 136 may include a variety of data, such as, for example, a tag identifier (e.g., a unique serial number or electronic product code (EPC) distinguishing different active tags 115A-N from one another), item information (e.g., data about the item to which the active tag 115A-N is attached), manufacturer or supplier information about the item, logistics data, usage data (e.g., records and when and where the active tag 115A-N has been scanned), etc.

Similarly, the reference tags 116A-N include an RFID chip 142, an antenna 138 for transmitting and receiving signals over different frequency bands, and a data store 145 (e.g., one or more memories) for storing tag data 146. However, unlike the active tags 115A-N, the reference tags 116A-N may include one or more LEDs 140 and/or one or more secondary tags 144. For example, the LED 140 may be positioned in a center of the reference tag 116 and may be relatively small compared to the overall size of the reference tag 116A-N (however, it should be appreciated that the LED 140 may be positioned anywhere on the reference tag 116A-N and have any size or shape). The LED 140, when activated or lit up (in some cases, to a threshold brightness or color), may still be detectable in an image. The secondary tags 144 may be NFC tags, UV tags, and/or IR tags, which may transmit response signals that may be detected by another device and/or sensor, such that the response signals may be evaluated to determine a location of the reference tags 116A-N. In this way, the reference tags 116A-N include at least two different domains by which a location may be inferred (e.g., using the RFID chip 142, LEDs 140, and/or secondary tags 144). In an embodiment, the reference tags 116A-N may include an additional power source (e.g., battery) to power the activation of the LED 140 if the signals received from the reader device 109A-N are not sufficient to power the LED 140 and transmit a response signal carrying the tag data 146.

The location of the reference tags 116A-N may be known because when the inventory environment 103 is built out, the reference tags 116A-N may have been intentionally placed at such known locations and/or the location or reference tags 116A-N are carefully determined and then stored in the data store 156. In this way, the location of the reference tags 116A-N may represent canonical sources of location information. To some extent, the location of the active tags 115A-N deemed proximate to reference tags 116A-N could be "snapped to" the location of the reference tags 116A-N, such that the location of the reference tag 116A-N may be equated to the location of the active tag 115A-N (when the active tag 115A-N is associated with the reference tag 116A-N based on a location of the active tag 115A-N).

The active tags 115A-N may be coupled to (e.g., affixed to) different movable items and thus may be used for tracking and identifying the items, enabling efficient inventory management and asset tracking in various inventory environments 103 (e.g., warehouses, retail stores, centers, etc.). The reference tags 116A-N may be coupled to fixtures, shelves, racks, or other fixed locations in the inventory environment. In an embodiment, one or more reference tags 116A-N may also be positioned on movable items.

The reader devices 109A-N may be devices that are configured to communicate with active tags 115A-N and reference tags 116A-N over licensed and/or unlicensed frequency bands. For example, the reader devices 109A-N may include antennas 120 and other communication equipment enabling the reader devices 109A-N to communicate with the active tags 115A-N and reference tags 116A-N. The reader devices 109A-N may also include an application 118 and a radio transceiver 122 (shown as "XCVR 122" in FIG. 1). The application 118 may be instructions stored on a memory of the reader device 109A-N, which may be executed by a processor of the reader device 109A-N to scan the active tags 115A-N and reference tags 116A-N, receive response signals from the active tags 115A-N and reference tags 116A-N, determine signal metadata 179 describing attributes of the response signals, and communicate tag data 136, 146 and signal metadata 179 associated with the response signals upstream to the management system 106. The radio transceiver 122 may include radio equipment enabling the reader devices 109A-N to communicate with other devices in the inventory environment 103 and/or to the management system 106 over the network 110.

The cameras 112A-N may be integrated into the reader devices 109A-N, or may be standalone separate devices that may be communicatively coupled to the reader devices 109A-N. In an embodiment, each of the cameras 112A-N may be depth cameras, which are imaging devices that capture 3D information about a distance between the camera 112A-N and an object in a field of view (e.g., an LED 140 on a reference tag 116A-N). In this case, the cameras 112A-N may include a camera application 124 and a radio transceiver 128 (shown as "XCVR 128" in FIG. 1). The camera application 124 may be instructions stored on a memory of the camera 112A-N and executable by a processor of the camera 112A-N. The radio transceiver 128 may include radio equipment enabling the cameras 112A-N to communicate with other devices in the inventory environment 103 and/or to the management system 106 over the network 110

The camera application 124 may capture images depicting one or more reference tags 116A-N in an inventory environment. When the camera 112A-N is a depth camera, the camera 112A-N may include various depth imaging equipment, such as, for example, an infrared projector, an infrared sensor, a standard red green blue (RGB) camera, etc., which may be used to determine distances between the camera 112A-N and the LED 140 on the reference tags 116A-N captured by the camera 112A-N. For example, the cameras 112A-N may capture images 171 in which each pixel contains depth information, representing the distance from the camera 112A-N to the object at the target pixel, or representing a location of the object in space (e.g., as three-dimensional (3D) or Global Positioning System (GPS) coordinates). The image 171 captured by a camera 112A-N may in some cases be a depth map or a 3D image, with distances reflected for each pixel. The camera application 124 may transmit captured images 171 to the management system 106, for tag detection, distance/location computation, and data storage.

In another embodiment, cameras 112A-N may be standard cameras for capturing, storing, and transmitting images 171, but the cameras 112A-N may not have depth calculation capabilities (e.g., may not be capable of calculating a distance from the camera 130A-N to each pixel captured in the image 171). In this case, the cameras 112A-N may transmit the images 171 to the management system 106. As further described herein, the management application 150 at the management system 106 may use a trained AI model (e.g., a machine learning system 190) to determine a location (e.g., x, y pixel coordinates) of the LED 140 in an image 171, determine a distance between the camera 112A-N and the identified pixel coordinates of the LED 140 in the image 171, and/or determine a location of the identified active tag 115A-N (as opposed to relying on depth computation capabilities of cameras 112A-N). For example, an intensity or appearance of the LED(s) 140 on a reference tag 116A-N may aid in determining the distance from the camera 112A-N to the reference tag 116A-N (in some cases, using a computer vision method at a machine learning system 190).

The management system 106 may be a device, UE, computer, or computer system, with various types of resources that may be interworked to control the operations of the reader devices 109A-N and cameras 112A-N to maintain accurate data regarding active tags 115A-N and reference tags 116A-N in the inventory environment 103. The management system 106 may include a processor, a memory, a radio transceiver, and other hardware or software components depending on the type of computer system running the management system 106. The management system 106 may include a management application 150, which may include instructions stored on a memory of the management system 106 and executable by a processor of the management system 106. The management application 150 may communicate with the reader devices 109A-N and cameras 112A-N, as further disclosed herein. For example, the management application 150 may programmatically evaluate the tag data 136, 146, signal metadata 179, images 171, and image metadata 174 received from the reader devices 109A-N and cameras 112A-N, determine expected variances 181 for the active tags 115A-N, compute radio-based and image-based locations for the active tags 115A-N and reference tags 116A-N, and update locations of moving active tags 115A-N, as further described herein.

The management system 106 may also include a data store 156 (e.g., one or more memories, distributed or co-located). The data store 156 may store reader data 159, camera data 161, active tag inventory data 163, reference tag inventory data 165, rules 167, thresholds 169, and tag mappings 170. The reader data 159 may include data describing the reader devices 109A-N deployed in the inventory environment 103. Specifically, the reader data 159 may include configurations 173 and location data 166 for each of the reader devices 109A-N. The configurations 173 may indicate, for example, antenna directionality, frequency band capabilities, read zones, etc. of the reader devices 109A-N. The location data 166 may indicate a known location of the reader devices 109A-N deployed in the inventory environment 103. The known location may be formatted as 3D coordinates relative to the inventory environment, GPS coordinates, a geohash value, and/or any other value identifying a location of each of the reader devices 109A-N. The camera data 161 may include data describing the cameras 112A-N deployed in the inventory environment 103. Specifically, the camera data 161 may include camera parameters 178 and location data 176 for each of the cameras 112A-N. The camera parameters 178 may include, for example, a focal length, sensor size, optical center, field of view, skew coefficient, pixel ratio, aspect ratio, camera position, camera orientation of each of the cameras 112A-N. The location data 176 may indicate a known location of the cameras 112A-N deployed in the inventory environment 103. The known location may be formatted as 3D coordinates relative to the inventory environment, GPS coordinates, a geohash value, and/or any other value identifying a location of each of the cameras 112A-N.

The active tag inventory data 163 may include data based on the response signals received from the active tags 115A-N in the inventory environment 103. The active tag inventory data 163 may include a reader device identification 177 of the reader device 109A-N that communicated with the active tag 115A-N, the tag data 136 received from the active tag 115A-N, signal metadata 179 (e.g., RSSI, time-of-arrival, angle of arrival, time-of-flight, phase, etc.) describing one or more attributes of the response signal over which the tag data 136 was received, and radio location data 180 defining a signal-based location of the active tag 115A-N computed using the response signal. The active tag inventory data 163 may also include an expected variance 181 between the radio location data 180 (e.g., an expected location of the active tag 115A-N) and image location data 183 of an associated reference tag 116A-N, and a current variance 182 between the radio location data 180 (e.g., a current location of the active tag 115A-N) and image location data 183 of an associated reference tag 116A-N. The reference tag inventory data 165 may include data based on the response signals received from the reference tags

116A-N and images 171 depicting the LED 140 on the reference tags 116A-N in the inventory environment 103. The reference tag inventory data 165 may include a reader device identification 177 of a reader device 109A-N that communicated with the reference tag 116A-N, a camera identification 172 of a camera 112A-N that captured an image 171 depicting an LED 140 on the reference tag 116A-N, the image 171 depicting the LED on the reference tag 116A-N, the tag data 146 received from the reference tag 116A-N, signal metadata 179 describing one or more attributes of the response signal over which the tag data 146 was received, radio location data 175 defining a signal-based location of the reference tag 116A-N computed using the response signal, and image location data 183 defining an image-based location of the reference tag 116A-N computed using the image 171 (and in some cases, using the machine learning system 190).

The rules 167 may be, for example, logic, code, conditions, equations, algorithms, etc., such that the management application 150 may be programmed according to the rules 167 to perform the dual-domain based tag location detection methods disclosed herein. The thresholds 169 may indicate an upper limit value of a deviation between a current variance 182 and the expected variance 181, before a rule 167 triggers the management application 150 to perform a particular task or action. The thresholds 169 may vary based on attributes and/or capabilities of the reader devices 109A-N, cameras 112A-N, active tags 115A-N, and reference tags 116A-N.

The tag mappings 170 may refer to predefined mappings between reference tags 116A-N and active tags 115A-N, indicating the active tags 115A-N that are proximate to one or more reference tags 116A-N, such that the location of a reference tag 116A-N may be used as a relative location of the active tags 115A-N. As mentioned above, each active tag 115A-N may be positioned within a predefined distance from at least one reference tag 116A-N, such that a location of each active tag 115A-N may be equated to an (image-based) location of at least one reference tag 116A-N. The tag mappings 170 may also indicate the predefined distance from each reference tag 116A-N in an inventory environment 103, such that any active tag 115A-N within a geometric (e.g., spherical) area of a predefined distance around a reference tag 116A-N may be associated with the reference tag 116A-N (i.e., the location of the reference tag 116A-N may be equated to the location of the active tag 115A-N). Additionally or alternatively, the tag mappings 170 may indicate a geographic area around or proximate to the reference tag 116A-N (e.g., in the form of 3D or GPS coordinate ranges), such that any active tag 115A-N within the geographic area may be associated with the reference tag 116A-N. For example, a reference tag 116A-N may be positioned on a price tag above a crate of items, and the tag mappings 170 may indicate the geographic area around the price tag and the crate, such that any active tags 115A-N in the geographic area may be associated with the reference tag 116A-N (i.e., the location of the active tags 115A-N in the geographic area may be equated to the location of the reference tag 116A-N).

The machine learning system 190 may be a one or more computers or computer systems, with various types of resources to perform machine learning on incoming data received from the data store 156. For example, the data stored in the data store 156 and any actions/tasks performed by the management application 150 or an employee in the inventory environment 103 may be input into the machine learning system 190. The machine learning system 190 may be programmed with various machine learning, neural networking, classification, computer vision, location estimation, and/or any other type of artificial intelligence (AI)-based algorithm. The machine learning system 190 may review the incoming data and make predictions related to the location of an active tag 115A-N and/or a corrective action or test to perform based on a change in the signal metadata 179 of a response signal received from an active tag 115A-N or based on an identified change in the signal-based location of the active tag 115A-N. For example, the machine learning system 190 may gather historical data including collected signal metadata 179, images 171, image metadata 174, reader data 159, camera data 161, active tag inventory data 163, reference tag inventory data 165, environmental data, corrective action data, performed test data, signal evaluation data, etc., over time to train the machine learning system 190 to learn patterns and relationships that help predict a location of an active tag 115A-N, a test to perform, or a corrective action to perform, with high accuracy, even when signals are affected by factors such as interference, multipath effects, or antenna misalignment. By continuously analyzing the data, the system 190 may also detect anomalies, such as configuration errors, interference, or signal distortions, to trigger the performance of tests or corrective actions (e.g., recalibrating antennas, filtering out noisy signals, adjusting reader power levels, etc.). Over time, the system 190 improves predictions through feedback loops, making the system 190 increasingly robust in dynamic inventory environments 103.

Figure 2:
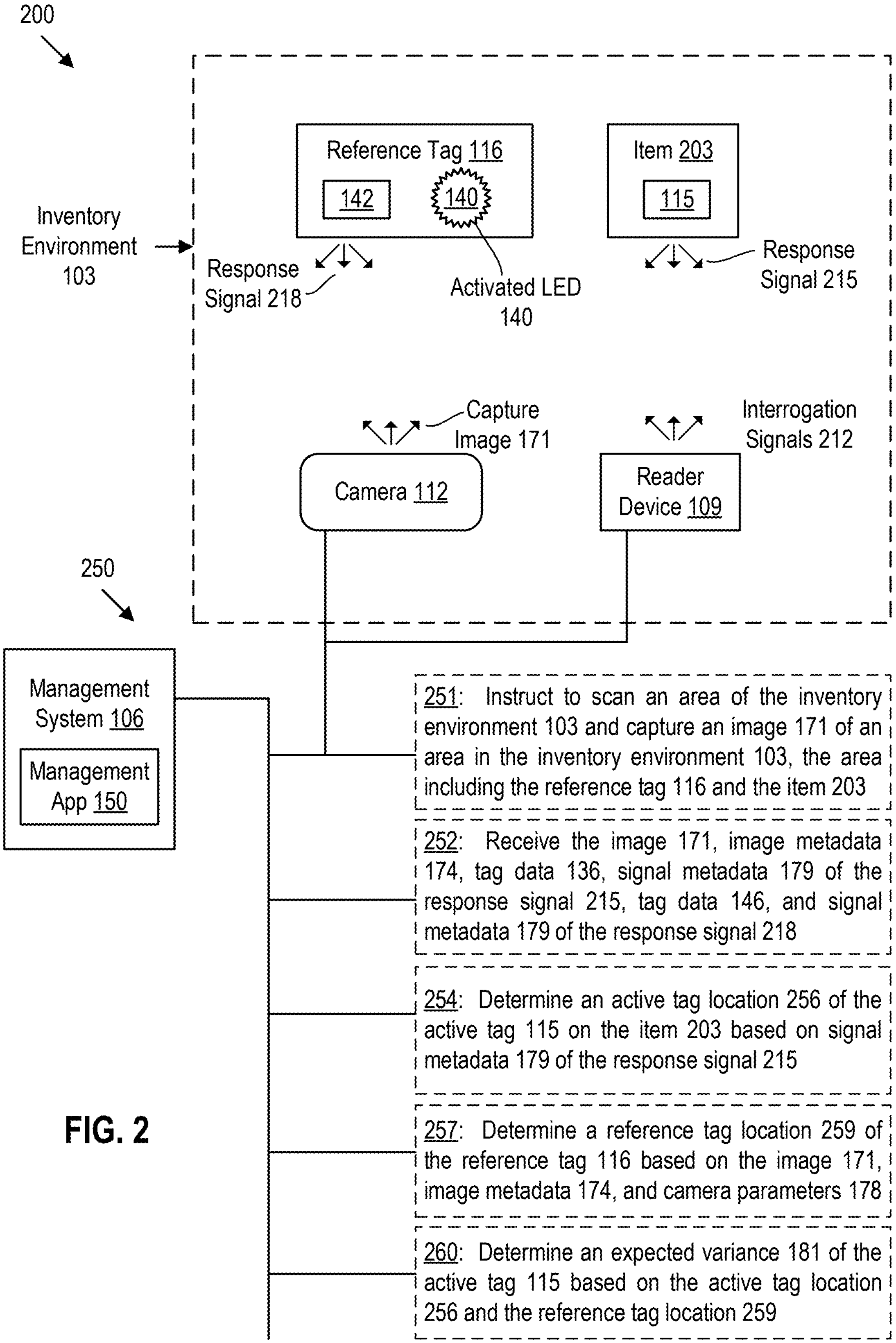
FIG. 2 is a diagram illustrating a method performing tag location detection based on RFID signals and visual signals in the dual-domain inventory system of FIG. 1 according to various embodiments of the disclosure.

Turning now to FIG. 2, shown is a diagram 200 illustrating an example inventory environment 103 and a method 250 for performing tag location detection based on RFID signals and visual signals according to various embodiments of the disclosure. The inventory environment 103 shown in FIG. 2 includes a reference tag 116, an item 203 coupled to an active tag 115, a reader device 109, and a camera 112. The reference tag 116 shown in FIG. 2 includes an RFID chip 142 and an LED 140. The item 203 is coupled to an active tag 115, which includes an RFID chip 132. While only one reference tag 116, item 203, active tag 115, reader device 109, and camera 112 are shown in the inventory environment 103 of FIG. 2, it should be appreciated that an inventory environment 103 may include any number of reference tags 116, items 203, active tags 115, reader devices 109, and cameras 112.

In particular, the method 250 shown in FIG. 2 may be performed to take a baseline inventory of the inventory environment 103, to scan the active tag 115 and reference tag 116, capture an image 171 depicting an LED 140 of the reference tag 116, and determine an expected variance between a radio-based location of the active tag 115 and an image-based location of the reference tag 116. Method 250 may begin with operation 251, in which the management application 150 may be programmed (e.g., according to a first rule 167) synchronously transmit instructions to the camera 112 and the reader device 109. The instruction sent to the reader device 109 may be to scan an area of the inventory environment 103 to read the reference tag 116 (e.g., the RFID chip 142) and to read the active tag 115 (e.g., the RFID chip 132) by transmitting interrogation signals 212 into the area, and then receiving response signals 215 (e.g., carrying tag data 136) from the active tag 115 and response signals 218 (e.g., carrying tag data 146) from the reference tag 116. The area may include the reference tag 116 and the item 203, and the area may be a zone or region within a larger inventory environment 103.

The application 118 at the reader device 109 may then obtain (e.g., determine, calculate, measure, etc.) the signal metadata 179 based on the response signals 215 from the active tag 115 and the signal metadata 179 based on the response signals 218 from the reference tag 116. After the reference tag 116 receives the interrogation signals 212, the reference tag 116 may power the LED 140 using the energy harvested from the interrogation signals 212.

The instruction sent to the camera 112 may be to capture an image 171 of the reference tag 116 in the inventory environment 103 (within a predefined amount of time after the instruction is sent to the reader device 109 and while the LED 140 is activated). The camera application 124 at the camera 112 may obtain (e.g., determine, calculate, measure, etc.) the image metadata 174 based on the image 171. In an embodiment, the camera application 124 may determine a depth, or distance, from the camera to the LED 140 on the reference tag 116, and this depth may be included in the image metadata 174.

In this way, the reader device 109 and the camera 112 may receive instructions from the management application 150 at a first time, substantially simultaneously. Then the reader device 109 may scan the area by transmitting interrogation signals 212 to the reference tag 116 and active tag 115 at a second time. Once the reference tag 116 is powered and activates the LED 140 at a third time (e.g., milliseconds after the second time), the camera 112 may capture the image 171 depicting the activated LED 142. In this way, the scanning of the reference tag 116/active tag 115 and capturing of the image 171 depicting the reference tag 116 is concurrent, overlapping in time to some extent, but not necessarily starting and stopping at the same times.

At operation 252, the management application 150 may receive the image 171, the image metadata 174, the tag data 136, the signal metadata 179 of the response signals 215, the tag data 146, and the signal metadata 179 of the response signals 218. The management application 150 may store the tag data 136 in the active tag inventory data 163 and store the tag data 146 in the reference tag inventory data 165. At operation 254, the management application 150 may determine, based on a rule 167, an active tag location 256 (i.e., a radio-based location) of the active tag 115 on the item 203 based on the signal metadata 179 of the response signal 215 received from the active tag 115.

For example, when the signal metadata 179 includes the RSSI of the response signal 215, the management application 150 may determine the active tag location 256 using an RSSI-based localization method (and in some cases, using the machine learning system 190). The RSSI-based localization method may input variables (RSSI, transmit power, path loss exponents, etc.) into an RSSI-based localization equation (and/or the machine learning system 190) to determine a distance between the reader device 109 and the active tag 115, which may be used to determine the active tag location 256 (e.g., 3D coordinates relative to the inventory environment, GPS coordinates, geohash, etc.) of the active tag 115. Additionally or alternatively, when the signal metadata 179 includes the angle of arrival of the response signal 215, the management application 150 may determine a location of the active tag 115 using an angle of arrival-based localization method (and in some cases, using the machine learning system 190). Additionally or alternatively, when the signal metadata 179 includes the time-of-flight of the response signal 215, the management application 150 may determine the active tag location 256 of the active tag 115 using a time-of-flight-based localization method (and in some cases, using the machine learning system 190). The signal metadata 179 of the response signals 215, 218 may be provided as input into one or more equations (and in some cases, using the machine learning system 190) to output an active tag location 256. In an embodiment, a similar method may be performed to determine a radio-based location of the reference tag 116 based on the signal metadata 179 of the response signals 218 received from the reference tag 116.

At operation 257, the management application 150 may determine, using a rule 167, a reference tag location 259 of the reference tag 116 based on the image 171, image metadata 174, and camera parameters 178. In an embodiment, the reference tag location 259 may be included in the image metadata 174 when the camera 112 is a depth camera, capable of computing a distance/location measurement based on the technologies available to the camera 112. In another embodiment, the management application 150 may first identify and determine the pixel coordinates (x, y) of the activated LED 140 in the image 171 using, for example, computer vision methods or artificial intelligence models in the machine learning system 190 accessible by the management system 106. For example, when the camera parameters 178 are known and the pixel coordinates of the activated LED 140 have been determined, the management application 150 may determine a location of the activated LED 140 using a pixel-based estimation method (and in some cases, the machine learning system 190), in which a position of the LED 140 in the 2D image may be mapped back to the 3D world using geometric relationships. The pixel-based estimation method may input variables (camera parameters 178, pixel coordinates, etc.) into a pixel-based estimation equation to determine a depth, or distance between the camera 112 and the LED 140. This distance may be used to determine the reference tag location 259.

At operation 260, the management application 150 may determine (e.g., compute) an expected variance 181 of the active tag 115 based on the active tag location 256 and the reference tag location 259. For example, the expected variance 181 may be a vector identifying a difference in both direction and location/distance (e.g., magnitude) between the (signal-based) active tag location 256 of the active tag 115 and the (image-based) reference tag location 259 of the reference tag 116. The management application 150 may store the expected variance 181 in association with the active tag 115.

Figure 3A:
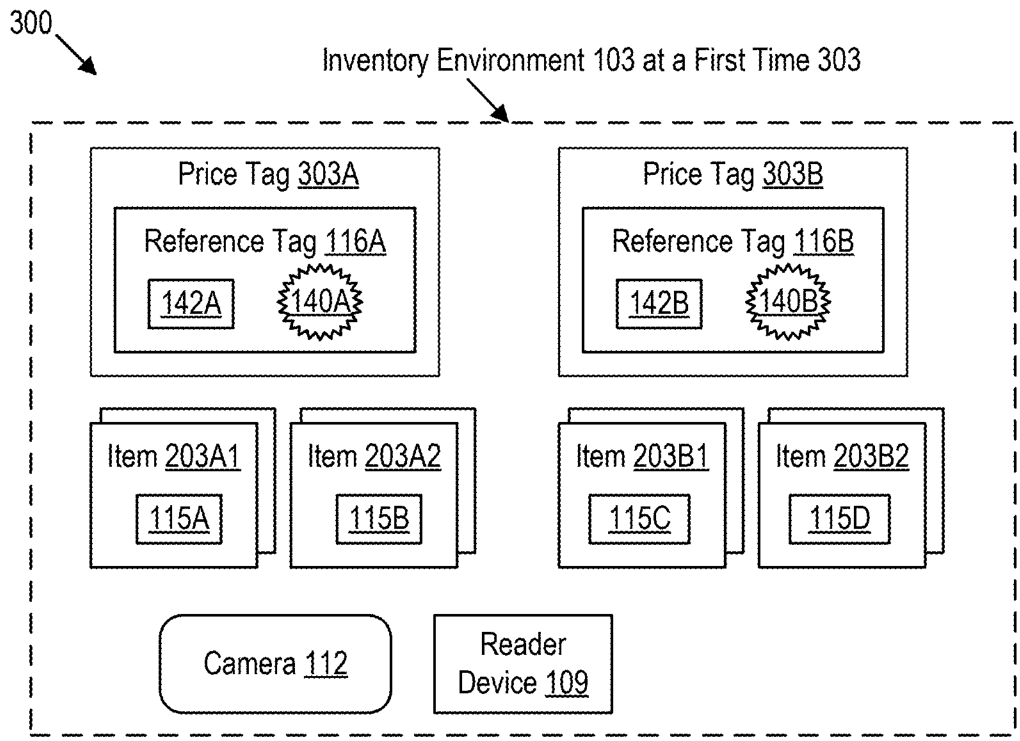
FIGS. 3A and 3B are diagrams illustrating a change in an inventory environment and a response by the dual-domain inventory system of FIG. 1 according to various embodiments of the disclosure.
Figure 3B:
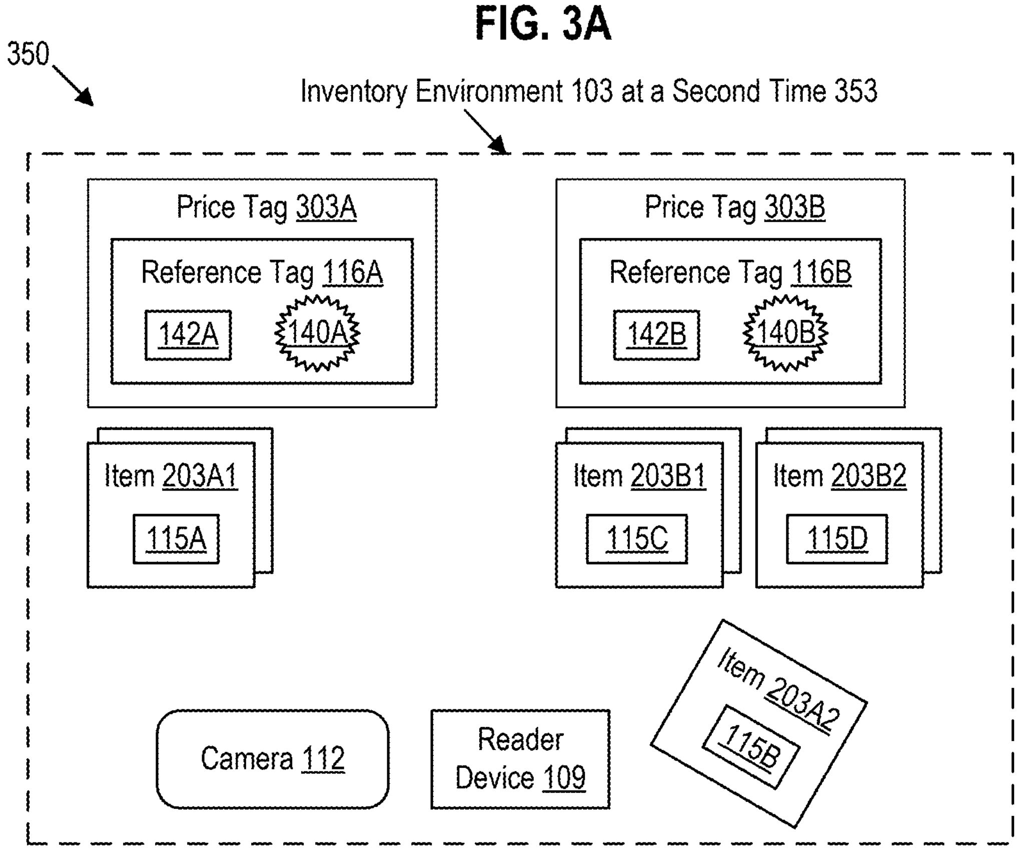

Turning now to FIGS. 3A-3B, shown are diagrams 300 and 350 illustrating an inventory environment 103 including multiple active tags 115A-D and reference tags 116A-B, and how the inventory system (including the camera 112 and the reader device 109) respond to changes in the inventory environment 103. In particular, FIG. 3A illustrates an inventory environment 103 at a first time 303, and FIG. 3B illustrates the inventory environment 103 at a second time 353.

As shown in the diagram 300 of FIG. 3A, the inventory environment 103 includes a camera 112 and a reader device 109 at a first time 303. While only one camera 112 and one reader device 109 are shown as included in the inventory environment 103, it should be appreciated that the inventory environment 103 may include any number of cameras 112 and reader devices 109. The inventory environment also includes items 203A1 and 203A2 (presumably of the same type of item/product), in which item 203A1 includes an active tag 115A and item 203A2 includes an active tag 115B. The items 203A1 and 203A2 are positioned under a price tag 303A of the items 203A1 and 203A2 (e.g., hooked onto rods underneath the price tag 303A). The price tag 303A may list the price of the items 203A1 and 203A2 and include a reference tag 116A. The reference tag 116A includes an RFID chip 142A and an LED 140A. The inventory environment 103 also includes items 203B1 and 203B2 (presumably of the same type of item/product), in which item 203B1 includes an active tag 115C and item 203B2 includes an active tag 115D. The items 203B1 and 203B2 are positioned under a price tag 303B of the items 203B1 and 203B2 (e.g., hooked onto rods underneath the price tag 303B). The price tag 303B lists the price of the items 203B1 and 203B2 and includes a reference tag 116B. The reference tag 116B includes an RFID chip 142B and an LED 140B.

The reader device 109 may scan the area of the inventory environment 103 shown in FIG. 3A, receive response signals 215 from the tags 115A-D and response signals 218 from the reference tags 116A-B, obtain signal metadata 179 for the response signals 215 and signal metadata 179 for the response signals 218, and transmit this data back to the management system 106. The camera 112 may capture one or more images 171 depicting the activated LED 140A on the reference tag 116A and the activated LED 140B on the reference tag 116B, obtain image metadata 174 of the images 171, and transmit this data back to the management system 106. The management application 150 may determine the active tag location 256 of the active tags 115A-D, the reference tag location 259 of the reference tags 116A-B, and expected variance 181 of the active tags 115A-D using method 250 described above with reference to FIG. 2. The expected variance 181 may be with respect to active tags 115A and 115B compared to reference tag 116A (based on the tag mappings 170) and with respect to active tags 115C and 115D compared to reference tag 116B (based on the tag mappings 170).

Turning now to the diagram 350 of FIG. 3B, shown is the inventory environment 103 at a second time 353 after the first time 303. The inventory environment 103 shown in FIG. 3B is similar to that which is shown in FIG. 3A, except that in FIG. 3B, the item 203A2 has changed locations (e.g., fallen off the hook under the price tag 303A, or fall on the floor of the inventory environment 103). The reader device 109 may be programmed to constantly or iteratively perform a scan of the area of the inventory environment 103. After the item 203A2 has changed locations, the reader device 109 may receive response signals 215 from the tag 115B that are characteristically different from the response signals 215 received from the tag 115B at the first time 303. That is, the signal metadata 179 of the response signals 215 received from the tag 115B at the first time 303 may be different from the signal metadata 179 of the response signals 215 received from the tag 115B at the second time 353 (e.g., the RSSI of the response signals 215 may be weaker at the second time 353 compared to the first time 303 since the item 203A2 may be farther from the reader device 109). Nevertheless, the application 118 at the reader device 109 may obtain the signal metadata 179 of the response signals 215 received from the moved tag 115B, and forward the tag data 136 and the signal metadata 179 to the management system 106.

The management application 150 may receive the tag data 136 and the signal metadata 179 from the reader device 109. In an embodiment, the management application 150 may determine that the signal metadata 179 of the response signals 215 received from the tag 115B at the second time 353 are different from the prior signal metadata 179 stored in association with the tag 115B. Additionally or alternatively, the management application 150 may determine (e.g., compute) the active tag location 256 of the active tag 115B using the signal metadata 179 of the response signals 215 received from the active tag 115B after the second time 353.

The management application 150 may then determine (e.g., compute) a current variance 182 between the active tag location 256 of the active tag 115B determined after the second time 353 and the image-based location of the corresponding reference tag 116A. The current variance 182 may be a vector identifying a difference in both direction and location/distance between the active tag location 256 determined after the second time 353 and the previously determined image-based location of the corresponding reference tag 116B. The management application 150 may then access a rule 167, which may indicate a predefined threshold 169 for the reader device 109 and/or active tag 115B (e.g., based on a frequency band, read range, power, or other attribute of the reader device 109 and/or active tag 115B). The rule 167 may instruct the management application 150 to perform a comparison of the current variance 182 with the expected variance 181. To this end, the management application 150 may compare the current variance 182 of the active tag 115B with an expected variance 181 of the active tag 115B to determine whether the current variance 182 deviates from the expected variance 181 beyond the threshold 169 defined in the rule 167.

When the current variance 182 deviates from the expected variance 181 beyond the threshold 169, the management application 150 may use a rule 167 to determine a next action or task to perform. For example, the management application 150 may first instruct the reader device 109 to transmit an interrogation signal 212 to the reference tag 116A to activate the LED 140A, and instruct the camera 112 to capture another image 171 depicting the activated LED 140A. The management application 150 may then determine an updated reference tag location 259 (if changed at all) based on the other image 171, image metadata 174, and camera parameters 178. The management application 150 may determine whether the change in the active tag location 256 of the active tag 115B is similarly changed in the updated reference tag location 259 of the reference tag 116B. If not, the management application 150 may determine another test or corrective action to perform based on a rule 167.

For example, the tests may include tests or verifications of various factors that may affect the response signals 215 received from the active tag 115B (but may not necessarily affect the LED 140 of the reference tag 116B). These factors may include, for example, multipath propagation (reflection/diffraction), interference from other radio frequency sources, antenna position and orientation, environmental changes, reader/system calibration, reader sensitivity, power supply variability, etc. For example, the management application 150 may instruct the repositioning of a reader device 109 (e.g., robotically control a robotic arm supporting a reader device 109) to alter the angle of reflection and test whether the alteration significantly affects the RSSI, in which case, multipath propagation could be the cause of the active tag location 256 change. As another example, the management application 150 may temporarily disable or relocate other radio frequency emitting devices to determine whether the RSSI readings stabilize. As yet another example, the management application 150 may use multiple antennas to read the active tag 115B, and compare the readings to identify inconsistencies caused by antenna placement. As yet another example, the management application 150 may instruct the recalibration of the reader devices 109 and/or cameras 112 in the inventory environment 103 to account for the environment or configuration change in the area of the inventory environment. The data gathered from these tests may be used to modify the equations and algorithms (and in some cases, the training/weighting of the machine learning system 190) used to determine locations of the active tags 115A-D.

The corrective action may be, for example, modifying the expected variance 181 of the active tag 115B based on the changed location, modifying the active tag location 256 of the active tag 115B by the expected variance 181 to obtain an updated location of the active tag 115B, modifying or tuning the training/weighting/algorithms of the machine learning system 190, etc. The expected variance 181 may refer to an expected level of error between the (signal-based) active tag location 256 and the (image-based) reference tag location 259. This expected variance 181 between a reference tag location 259 and an active tag location 256 may be expected to remain constant even when the active tag 115B moves locations to different areas covered by different reference tags 116A-B (because the active tag location 256 may be assumed to be the same as at least one reference tag location 259). Therefore, one corrective action may involve associating a different reference tag 116A-B with the active tag 115B based on the updated location of the active tag 115B, to ensure that the active tag 115B is mapped to the reference tag 116A-B having the same or substantially the same location as the active tag 115B.

In some cases, the response signals 218 and signal metadata 179 describing the response signals 218 may further be used to more precisely tune a location of an active tag 115B. For example, the response signals 218 from the reference tag 116A-B may be used to identify expected errors, distortions, and/or interference in radio signals communicated in that area of the inventory environment 103. These expected errors, distortions, and/or interference may be used to further tune the active tag location 256 of the active tag 115B. The active tag location 256 may be stored in the radio location data 180 in the active tag inventory data 163 of the active tag 115B.

Figure 4:
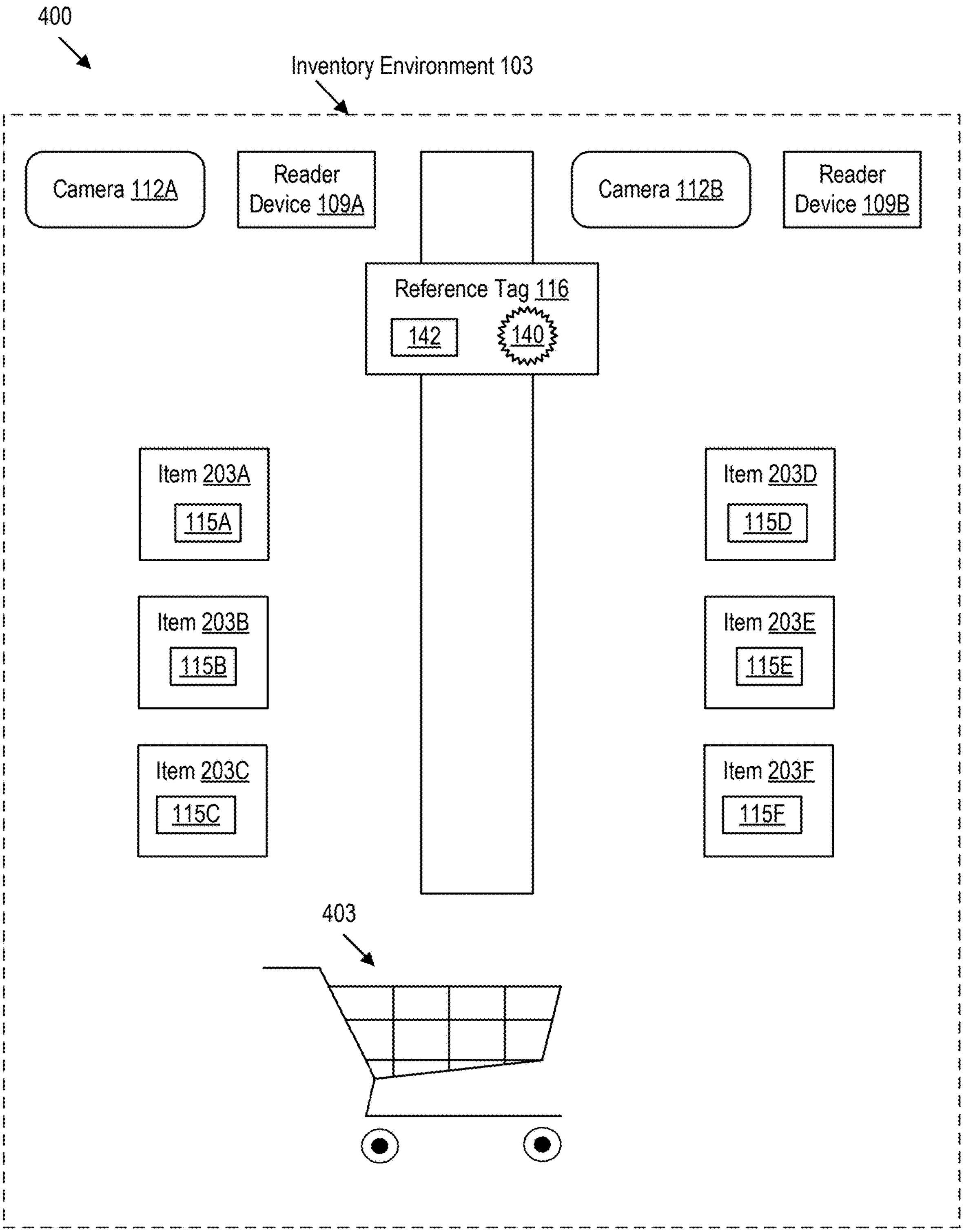
FIG. 4 is a diagram illustrating an example reference tag and RFID tag in an inventory environment of the dual-domain inventory system of FIG. 1 according to various embodiments of the disclosure.

Referring now to FIG. 4, shown is a diagram 400 illustrating another inventory environment 103 (e.g., retail store). In the inventory environment 103, the reference tag 116 includes the RFID chip 142 and an LED 140, and is positioned on a structural column in the inventory environment 103. Around the structural column may be various bins or tables supporting different items 203A, 203B, 203C, 203D, 203E, and 203F. Item 203A includes active tag 115A, item 203B includes active tag 115B, item 203C includes active tag 115C, item 203D includes active tag 115D, item 203E includes active tag 115E, and item 203F includes active tag 115F. The inventory environment 103 may also include the shopping cart 403, which the customer may use to temporarily hold an item 203A-F while the customer continues to shop around the store. The reference tag 116 may be proximate enough to the items 203A-F such that the location of the items 203A-F may be considered substantially similar if not the same as the location of the reference tag 116.

As shown in FIG. 4, the inventory environment 103 may also include two cameras 112A and 112B and two reader devices 109A and 109B, both positioned on different sides of the column fixture. In this case, the cameras 112A-B may have already captured an image 171 depicting the reference tag 116, and the management application 150 may have already determined a reference tag location 259 of the reference tag 116 based on the image 171.

As an illustrative example, a customer may pick up item 203C and place the item 203C into the shopping cart 403. As the customer moves the shopping cart 403 around, the reader devices 109A-B may continuously scan the area and receive response signals 215 from all of the active tags 115A-F on all of the items 203A-F. The reader devices 109A-B may obtain the corresponding signal metadata 179 for the response signals 215 and forward the signal metadata 179 with received tag data 136 to the management system 106. The management application 150 at the management system 106 may continuously determine updated active tag location data 256 of the active tag 115C on item 203C as the item 203C moves, confirm whether the active tag 115C is indeed moving based on a comparison between a current variance 182 of the active tag 115C and the reference tag 116 and the expected variance 181 of the active tag 115C and the reference tag 116, and perform various tasks, tests, and/or corrective actions in response to the aforementioned comparison, as discussed above.

When the shopping cart 403 with item 203C is moved to another area in the inventory environment associated with another reference tag 116, the management application 150 may determine and confirm the updated active tag location 256 as being associated with the other reference tag 116, based on, for example, the predefined location range data stored in the tag mappings 170.

Figure 5:
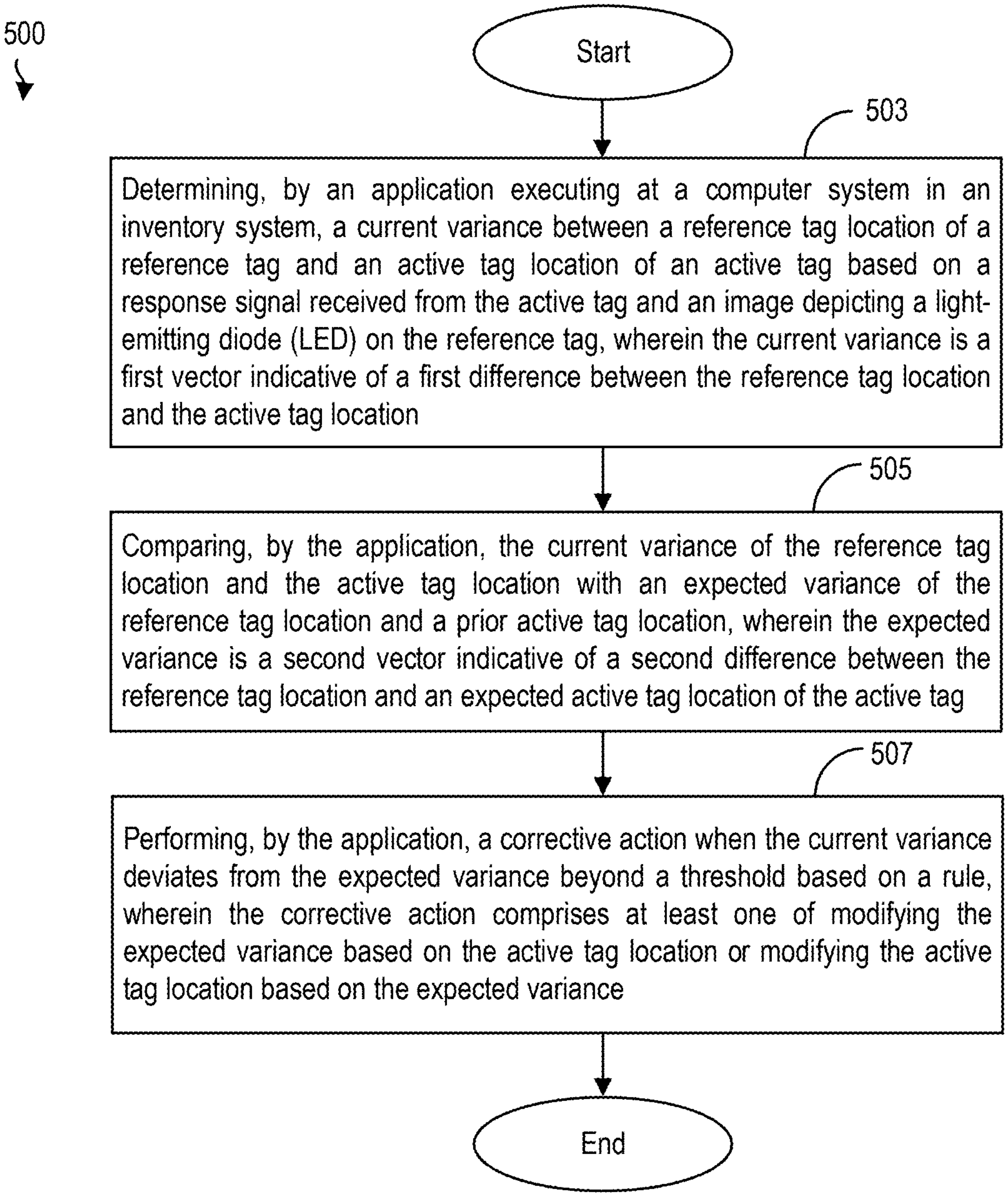
FIG. 5 is a flowchart illustrating a first method of performing tag location detection based on RFID signals and visual signals in the dual-domain inventory system of FIG. 1 according to various embodiments of the disclosure.
Figure 7:
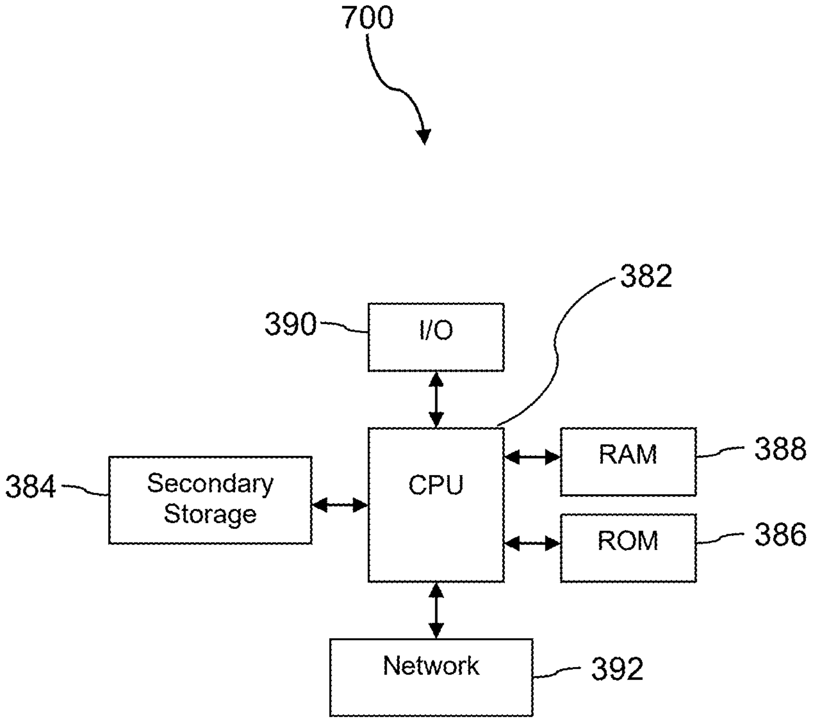
FIG. 7 is a block diagram of a computer system implemented within the communication network of FIG. 1 according to an embodiment of the disclosure.

Turning now to FIG. 5, shown is a method 500 of performing tag location detection based on RFID signals and visual signals in the dual-domain inventory system of FIG. 1. In embodiments, the method 500 may be implemented using a computer system with components as shown in FIG. 7. As illustrated, method 500 of FIG. 5 includes a number of enumerated operations, but embodiments of the operations in FIG. 5 may include additional operations before, after, and in between the enumerated operations. In some embodiments, one or more of the enumerated operations may be omitted or performed in a different order. Method 500 may be performed by an application executing at a computer system, and the application may refer to the management application 150 at the management system 106, the application 118 at a reader device 109A-N, and/or the camera application 124 at a camera 112.

At step 503, method 500 comprises determining, by an application executing at a computer system in an inventory system, a current variance between a reference tag location 259 of a reference tag 116 and an active tag location 256 of an active tag 115 based on a response signal 214 received from the active tag 115 and an image 171 depicting an LED 140 on the reference tag 116. In an embodiment, the current variance 182 is a first vector indicative of a difference between the reference tag location and the active tag location. At step 505, method 500 comprises comparing, by the application, the current variance 182 of the reference tag location 259 and the active tag location 256 with an expected variance 181 of the reference tag location 259 and a prior active tag location 256. In an embodiment, the expected variance 181 is a second vector indicative of a second difference between the reference tag location 259 and an expected active tag location 256 of the active tag 115. At step 507, method 500 comprises performing, by the application, a corrective action when the current variance 182 deviates from the expected variance 181 beyond a threshold 169 based on a rule 167. In an embodiment, the corrective action comprises at least one of modifying the expected variance 181 based on the active tag location 256 or modifying the active tag location 256 based on the expected variance 181.

Method 500 may further comprise additional attributes and/or steps not explicitly shown in FIG. 5. In an embodiment, the current variance is based on signal metadata 179 of the response signal 215, in which the signal metadata 179 comprises at least one of a received signal strength indicator (RSSI) of the response signal 215, a phase of the response signal 215, a time of arrival of the response signal 215, or a time of flight of the response signal 215. In an embodiment, the current variance is based on image metadata 174 of the image 171 and camera parameters 178 of a camera 112 that captured the image 171. In an embodiment, the image metadata 174 comprises a timestamp of the image 171, a resolution of the image 171, and pixel coordinates of the LED 140 on the reference tag 116, in which the camera parameters 178 comprise a focal length between a camera sensor and a lens of the camera 112 and a field of view of the camera 112. In an embodiment, the expected variance is based on a prior response signal received from the active tag 115 and a prior image depicting the LED 140 on the reference tag 116.

In an embodiment, determining the current variance between the reference tag location 259 and the active tag location 256 comprises determining, by the application, the reference tag location 259 based on the image 171 depicting the LED 140 on the reference tag 116 using at least one of a computer vision application or an image-based location application, determining, by the application, the active tag location 256 based on signal metadata 179 of the response signal 215 received from the active tag 115, and computing, by the application, the current variance 182 between the reference tag location 259 and the active tag location 256 based on the second difference between the reference tag location 259 and the active tag location 256. In an embodiment, comparing the current variance with the expected variance 181 comprises determining, by the application, that the active tag location 256 is different from the prior active tag location 256, in which the active tag location 256 is based on the response signal 215 received from the active tag 115 and the prior active tag location 256 is based on a prior response signal 215 received from the active tag 115, and in which the reference tag location 259 based on the image 171 depicting the LED 140 on the reference tag 116 and a prior image 171 depicting the LED 141 on the reference tag 116 has remained constant, in which the corrective action comprises modifying the active tag location 256 by the expected variance 181 to apply error correction to the active tag location. In an embodiment, method 500 may further comprise determining, by the application, a radio-based reference tag location based on signal metadata 179 associated with a response signal 215 received from a radio frequency identification (RFID) chip 142 on the reference tag 116, and comparing, by the application, the active tag location 256 with the radio-based reference tag location and the reference tag location determined using the image 171 to identify errors or distortions in radio signals transmitted by the RFID chip 142 and the active tag 115, wherein the corrective action comprises modifying the active tag location based on the errors or distortions.

Figure 6:
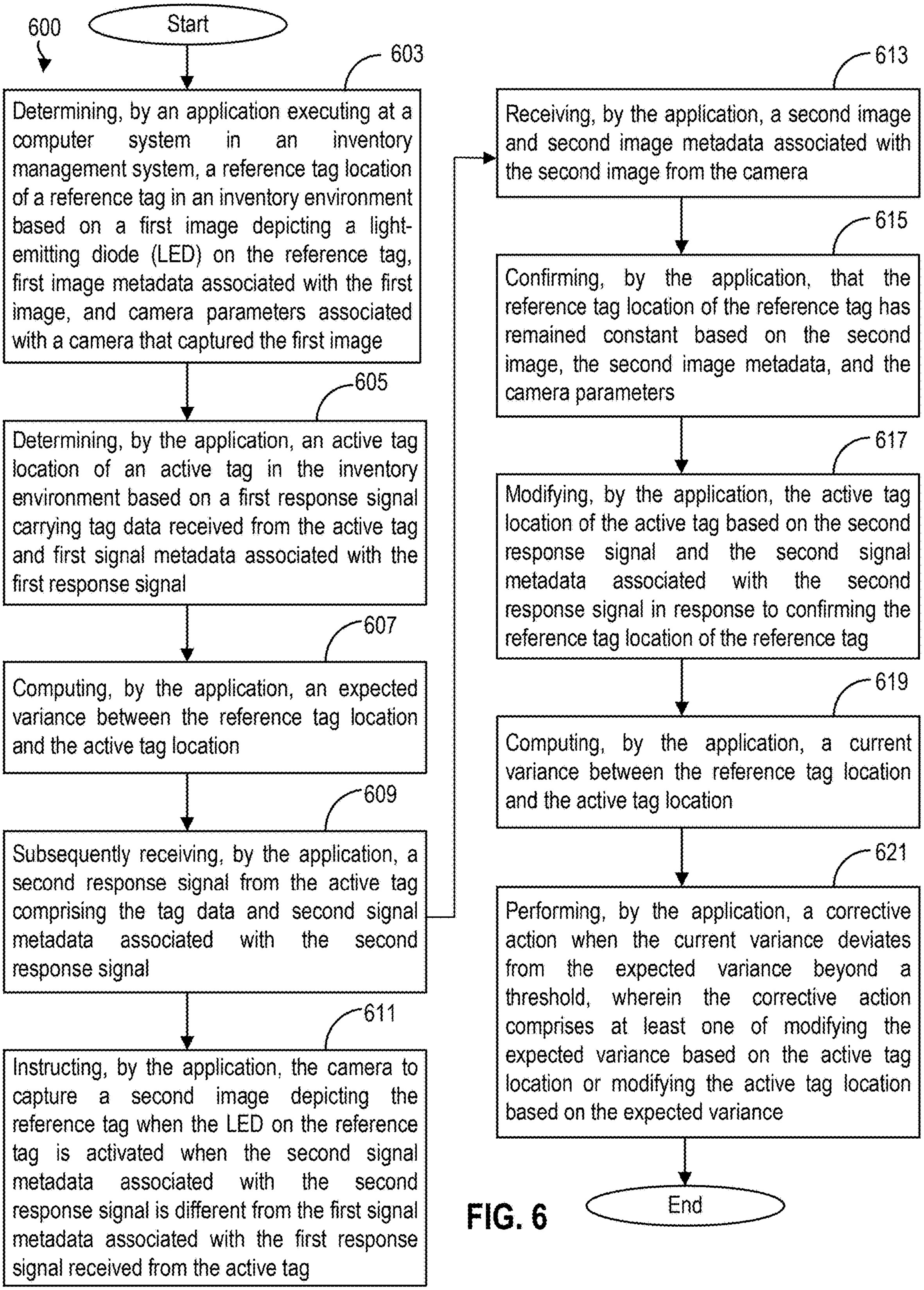
FIG. 6 is a flowchart illustrating a second method of performing tag location detection based on RFID signals and visual signals in the dual-domain inventory system of FIG. 1 according to various embodiments of the disclosure.

Turning now to FIG. 6, shown is another method 600 of performing tag location detection based on RFID signals and visual signals in the dual-domain inventory system of FIG. 1. In embodiments, the method 600 may be implemented using a computer system with components as shown in FIG. 7. As illustrated, method 600 of FIG. 6 includes a number of enumerated operations, but embodiments of the operations in FIG. 6 may include additional operations before, after, and in between the enumerated operations. In some embodiments, one or more of the enumerated operations may be omitted or performed in a different order. Method 600 may be performed by an application executing at a computer system, and the application may refer to the management application 150 at the management system 106, the application 118 at a reader device 109, and/or the application 124 at a camera 112.

At step 603, method 600 comprises determining, by an application executing at a computer system in an inventory management system, a reference tag location 259 of a reference tag 116 in an inventory environment 103 based on a first image 171 depicting a LED 140 on the reference tag 116, first image metadata 174 associated with the first image 171, and camera parameters 178 associated with a camera 112 that captured the first image 171. At step 605, method 600 comprises determining, by the application, an active tag location 256 of an active tag 115 in the inventory environment 103 based on a first response signal 215 carrying tag data 136 received from the active tag 115 and first signal metadata 179 associated with the first response signal 215. At step 607, method 600 comprises computing, by the application, an expected variance 181 between the reference tag location 259 and the active tag location 256.

At step 609, method 600 comprises subsequently receiving, by the application, a second response signal 215 from the active tag 115 comprising the tag data 136 and second signal metadata 179 associated with the second response signal 215. At step 611, method 600 comprises instructing, by the application, the camera 112 to capture a second image 171 depicting the reference tag 116 when the LED 140 on the reference tag 116 is activated when the second signal metadata 179 associated with the second response signal 215 is different from the first signal metadata 179 associated with the first response signal 215 received from the active tag 115. At step 613, method 600 comprises receiving, by the application, a second image 171 and second image metadata 174 associated with the second image 171 from the camera 112.

At step 615, method 600 comprises confirming, by the application, that the reference tag location 259 of the reference tag 116 has remained constant based on the second image 171, the second image metadata 174, and the camera parameters 178. At step 617, method 600 comprises modifying, by the application, the active tag location 256 of the active tag 115 based on the second response signal 215 and the second signal metadata 137 associated with the second response signal 215 in response to confirming the reference tag location 259 of the reference tag 116. At step 619, method 600 comprises computing, by the application, a current variance 182 between the reference tag location 259 and the active tag location 256. At step 621, method 600 comprises performing, by the application, a corrective action when the current variance 182 deviates from the expected variance 181 beyond a threshold 169. In an embodiment, the corrective action comprises at least one of modifying the expected variance 181 based on the active tag location 256 or modifying the active tag location 259 based on the expected variance 181.

Method 600 may further comprise additional attributes and/or steps not explicitly shown in FIG. 6. In an embodiment, method 600 may further comprise storing, by the application in a data store 156 of the inventory management system, the first image 171 and the first image metadata 174, storing, by the application in the data store 156, the tag data 136 received from the active tag 115 and the first signal metadata 179 associated with the first response signal 215, and storing, by the application in the data store 156, the expected variance 181 in association with the active tag 115. In an embodiment, method 600 may further comprise instructing, by the application, the reader device 109 to perform an inventory scan in a read zone of the reader device, in which the read zone is an area of the inventory environment 103 in which the reference tag 116 and the active tag 115 are located, and the first response signal 215 is received in response to instructing the reader device 109 to perform the inventory scan.

In an embodiment, the reference tag 116 is positioned within a predefined distance from the active tag 115 (such that the location of the reference tag 116 may be used as the location of the active tag 115). In an embodiment, the expected variance 181 between the reference tag location 259 and the active tag location 256 is a vector representing a difference between the reference tag location 259 and the active tag location 256, in which the active tag location 256 is based on the first image 171 and the first response signal 215. In an embodiment, the current variance 182 between the reference tag location 259 and the active tag location 256 comprises a vector representing a difference between the reference tag location 259 and the active tag location 259, in which the active tag location 256 is based on the second image 171 and the second response signal 215.

FIG. 7 illustrates a computer system 700 suitable for implementing one or more embodiments disclosed herein. In an embodiment, the management system 106, reader devices 109, etc., may each be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of dual-domain based tag location detection in an inventory environment, wherein the method comprises:

determining, by an application executing at a computer system in an inventory management system, a reference tag location of a reference tag in the inventory environment based on a first image depicting a light-emitting diode (LED) on the reference tag, first image metadata associated with the first image, and camera parameters associated with a camera that captured the first image;

determining, by the application, an active tag location of an active tag in the inventory environment based on a first response signal carrying tag data received from the active tag and first signal metadata associated with the first response signal;

computing, by the application, an expected variance between the reference tag location and the active tag location;

subsequently receiving, by the application, a second response signal from the active tag comprising the tag data and second signal metadata associated with the second response signal;

instructing, by the application, the camera to capture a second image depicting the reference tag when the LED on the reference tag is activated when the second signal metadata associated with the second response signal is different from the first signal metadata associated with the first response signal received from the active tag;

receiving, by the application, the second image and second image metadata associated with the second image from the camera;

confirming, by the application, that the reference tag location of the reference tag has remained constant based on the second image, the second image metadata, and the camera parameters;

modifying, by the application, the active tag location of the active tag based on the second response signal and the second signal metadata associated with the second response signal in response to confirming the reference tag location of the reference tag;

computing, by the application, a current variance between the reference tag location and the active tag location; and performing, by the application, a corrective action when the current variance deviates from the expected variance beyond a threshold, wherein the corrective action comprises at least one of modifying the expected variance based on the active tag location or modifying the active tag location based on the expected variance.

2. The method of claim 1, further comprising:

storing, by, the application in a data store of the inventory management system, the first image and the first image metadata;

storing, by the application in the data store, the tag data received from the active tag and the first signal metadata associated with the first response signal; and storing, by the application in the data store, the expected variance in association with the active tag.

3. The method of claim 1, further comprising instructing, by the application, a reader device to perform an inventory scan in a read zone of the reader device, wherein the read zone is an area of the inventory environment in which the reference tag and the active tag are located, and wherein the first response signal is received in response to instructing the reader device to perform the inventory scan.

4. The method of claim 1, wherein the reference tag is positioned within a predefined distance from the active tag.

5. The method of claim 1, wherein the expected variance between the reference tag location and the active tag location is a vector representing a difference between the reference tag location and the active tag location, wherein the active tag location is based on the first image and the first response signal.

6. The method of claim 1, wherein the current variance between the reference tag location and the active tag location comprises a vector representing a difference between the reference tag location and the active tag location, wherein the active tag location is based on the second image and the second response signal.

7. An inventory system, comprising:

a reader device configured to:

transmit interrogation signals to a reference tag and an active tag, wherein the reference tag comprises a light-emitting diode (LED);

receive, from the active tag, a response signal carrying tag data;

transmit the tag data and signal metadata describing the response signal to an inventory management system;

transmit an instruction to a camera to capture an image depicting the LED on the reference tag when the LED is activated; and transmit a further instruction to the camera to capture a further image depicting the LED on the reference tag when the LED is activated;

the camera configured to:

transmit the image and image metadata describing the image to the inventory management system; and transmit the further image and further image metadata describing the further image to the inventory management system; and the inventory management system comprising:

a memory; and a management application stored on the memory, which when executed by a processor of the inventory management system, causes the management application to:

determine an active tag location of the active tag based on the response signal, the signal metadata, the image, and the image metadata;

confirm that a reference tag location of the reference tag has remained constant based on the further image, the further image metadata, and camera parameters of the camera;

modify the active tag location of the active tag based on the response signal and the signal metadata, in response to confirming the reference tag location of the reference tag, to determine an updated active tag location for comparison with an expected variance;

determine a current variance between the reference tag location of the reference tag and the updated active tag location of the active tag, wherein the current variance is a first vector indicative of a first difference between the reference tag location and the updated active tag location;

compare the current variance between the reference tag location and the updated active tag location with the expected variance between the reference tag location and a prior active tag location, wherein the expected variance is a second vector indicative of a second difference between the reference tag location and an expected active tag location of the active tag; and update location data of the active tag to be the updated active tag location when the current variance deviates from the expected variance by more than a threshold.

8. The inventory system of claim 7, wherein the camera is configured to capture the image at least a first period of time after the interrogation signals are sent and within a second period of time from the response signal being received.

9. The inventory system of claim 7, wherein the reference tag harvests power using the interrogation signals to power the LED, and wherein the active tag harvests power using the interrogation signals to transmit the response signal.

10. The inventory system of claim 7, wherein the reference tag is positioned within a predefined distance from the active tag.

11. The inventory system of claim 7, wherein the active tag location of the active tag is computed based on the signal metadata of the response signal, wherein the signal metadata comprises at least one of a received signal strength indicator (RSSI) of the response signal, a phase of the response signal, a time of arrival of the response signal, or a time of flight of the response signal.

12. The inventory system of claim 7, wherein the reference tag location of the reference tag is computed based on the image metadata of the image and the camera parameters of the camera, wherein the image metadata comprises at least one of a timestamp of the image, a resolution of the image, or pixel coordinates of the LED on the reference tag, and wherein the camera parameters comprise at least one of a focal length between a camera sensor or a lens of the camera and a field of view of the camera.

13. A method, comprising:

determining, by an application executing at a computer system in an inventory management system, an active tag location of an active tag based on a first response signal received from the active tag, first signal metadata associated with the first response signal, and a first image depicting a light-emitting diode (LED) on a reference tag;

receiving, by the application, a second response signal from the active tag and second signal metadata associated with the second response signal;

instructing, by the application, a camera to capture a second image depicting the reference tag when the LED on the reference tag is activated when the second signal metadata associated with the second response signal is different from the first signal metadata associated with the first response signal received from the active tag;

receiving, by the application, the second image depicting the LED on the reference tag;

confirming, by the application, that a reference tag location of the reference tag has remained constant based on the second image and camera parameters of the camera;

modifying, by the application, the active tag location of the active tag based on the second response signal and the second signal metadata in response to confirming the reference tag location of the reference tag, to determine an updated active tag location for comparison with an expected variance;

determining, by the application, a current variance between the reference tag location of the reference tag and the updated active tag location, wherein the current variance is a first vector indicative of a first difference between the reference tag location and the updated active tag location;

comparing, by the application, the current variance between the reference tag location and the updated active tag location with the expected variance between the reference tag location and a prior active tag location, wherein the expected variance is a second vector indicative of a second difference between the reference tag location and an expected active tag location of the active tag; and performing, by the application, a corrective action when the current variance deviates from the expected variance beyond a threshold based on a rule, wherein the corrective action comprises at least one of modifying the expected variance based on the updated active tag location or modifying the updated active tag location based on the expected variance.

14. The method of claim 13, wherein the current variance is based on signal metadata of the response signal, wherein the signal metadata comprises at least one of a received signal strength indicator (RSSI) of the response signal, a phase of the response signal, a time of arrival of the response signal, or a time of flight of the response signal.

15. The method of claim 13, wherein the current variance is based on image metadata of the image and the camera parameters of the camera that captured the image.

16. The method of claim 15, wherein the image metadata comprises a timestamp of the image, a resolution of the image, and pixel coordinates of the LED on the reference tag, and wherein the camera parameters comprise a focal length between a camera sensor and a lens of the camera and a field of view of the camera.

17. The method of claim 13, wherein the expected variance is based on a prior response signal received from the active tag and a prior image depicting the LED on the reference tag.

18. The method of claim 13, wherein determining the current variance between the reference tag location and the updated active tag location comprises:

determining, by the application, the reference tag location based on the image depicting the LED on the reference tag using at least one of a computer vision application or an image-based location application;

determining, by the application, the updated active tag location based on signal metadata of the response signal received from the active tag; and computing, by the application, the current variance between the reference tag location and the updated active tag location based on a difference between the reference tag location and the updated active tag location.

19. The method of claim 13, wherein comparing the current variance with the expected variance comprises:

determining, by the application, that the updated active tag location is different from the prior active tag location, wherein the updated active tag location is based on the response signal received from the active tag and the prior active tag location is based on a prior response signal received from the active tag, and wherein the reference tag location determined based on the image depicting the LED on the reference tag and a prior image depicting the LED on the reference tag has remained constant;

wherein the corrective action comprises modifying the updated active tag location by the expected variance to apply error correction to the updated active tag location.

20. The method of claim 13, further comprising:

determining, by the application, a radio-based reference tag location based on signal metadata associated with a response signal received from a radio frequency identification (RFID) chip on the reference tag; and comparing, by the application, the updated active tag location with the radio-based reference tag location and the reference tag location determined using the image to identify errors or distortions in radio signals transmitted by the RFID chip and the active tag;

wherein the corrective action comprises modifying the updated active tag location based on the errors or the distortions.

* * * * *